United States Patent

Stephen, Jr.

[15] 3,688,758
[45] Sept. 5, 1972

[54] GAS FIRED BARBECUE KETTLE

[72] Inventor: George A. Stephen, Jr., 606 S. Can-Dota, Mount Prospect, Ill. 60056

[22] Filed: April 15, 1971

[21] Appl. No.: 134,139

[52] U.S. Cl. .............................. 126/41 R, 126/25 A
[51] Int. Cl. .......................... A47j 37/00, F24c 3/04
[58] Field of Search ................ 126/41 R, 25 R, 25 A

[56] References Cited

UNITED STATES PATENTS

| | | |
|---|---|---|
| 1,394,228 | 10/1921 | Sheridan ........... 126/25 AU X |
| 3,217,634 | 11/1965 | Fox ...................... 126/25 A X |
| 3,386,432 | 6/1968 | Hanson ..................... 126/41 R |
| 3,638,634 | 2/1972 | Bolitho ..................... 126/41 R |

Primary Examiner—Charles J. Myhre
Attorney—Olson, Trexler, Wolters & Bushnell

[57] ABSTRACT

Outdoor cooking apparatus comprises a cooling vessel, a support therefor and a cooperating baffle-burner system which permits of either direct or indirect firing of the cooking area.

20 Claims, 15 Drawing Figures

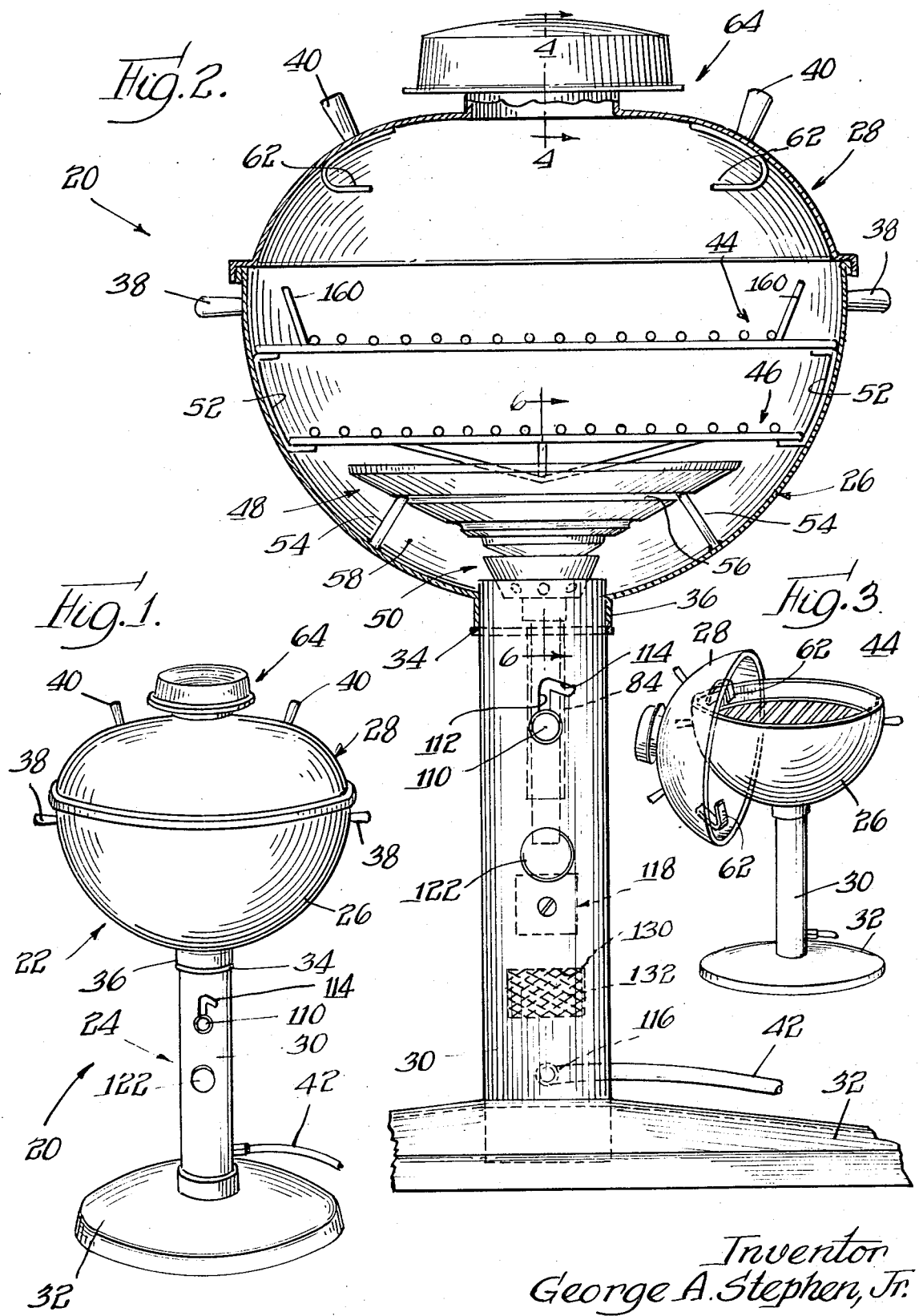

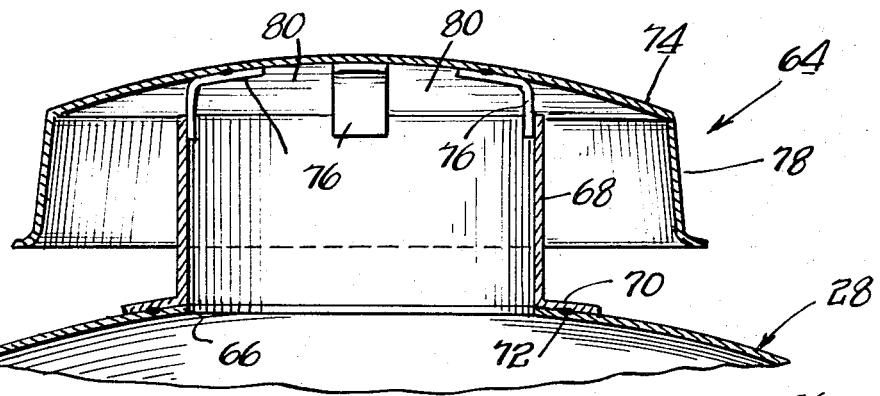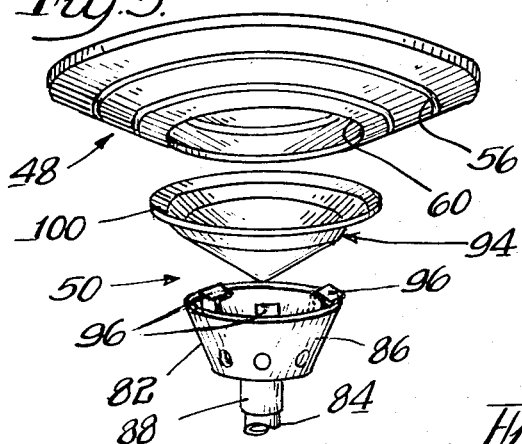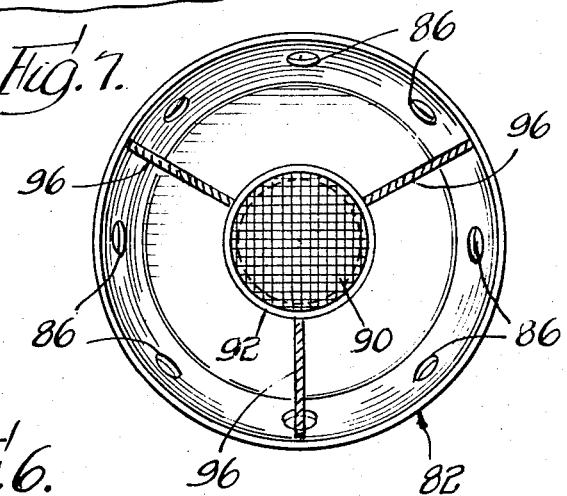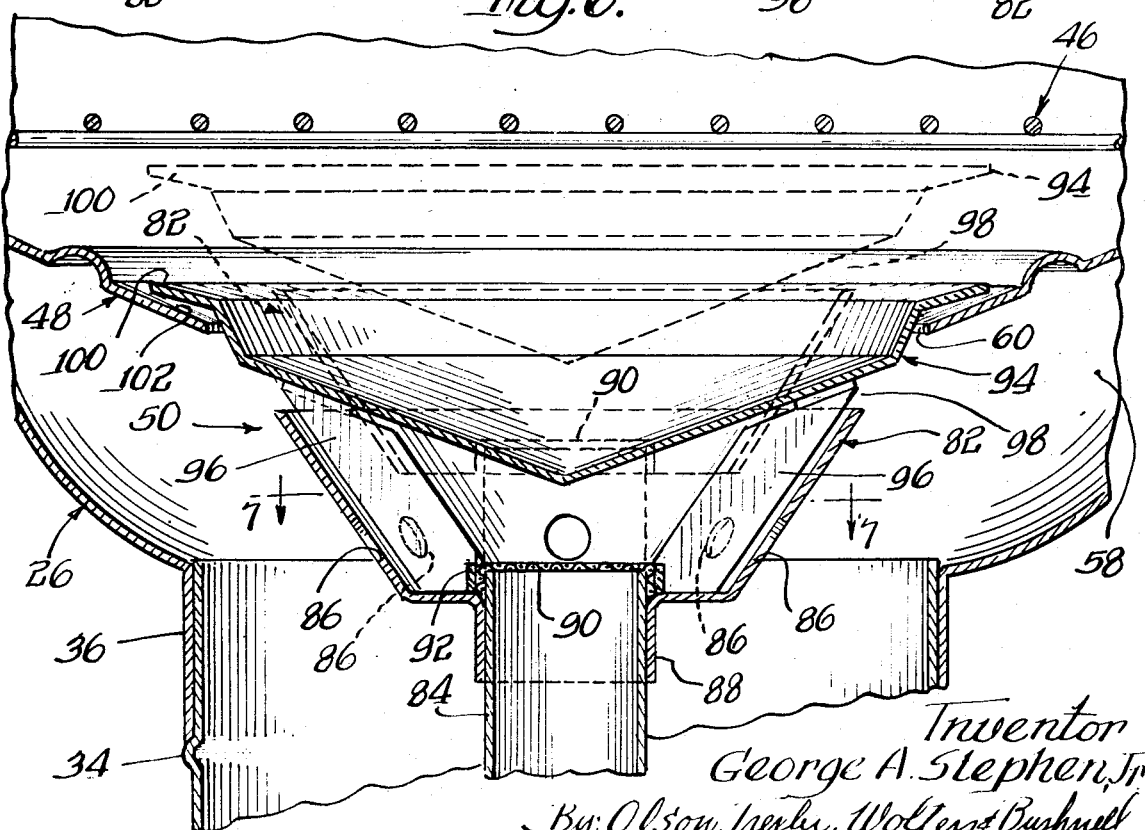

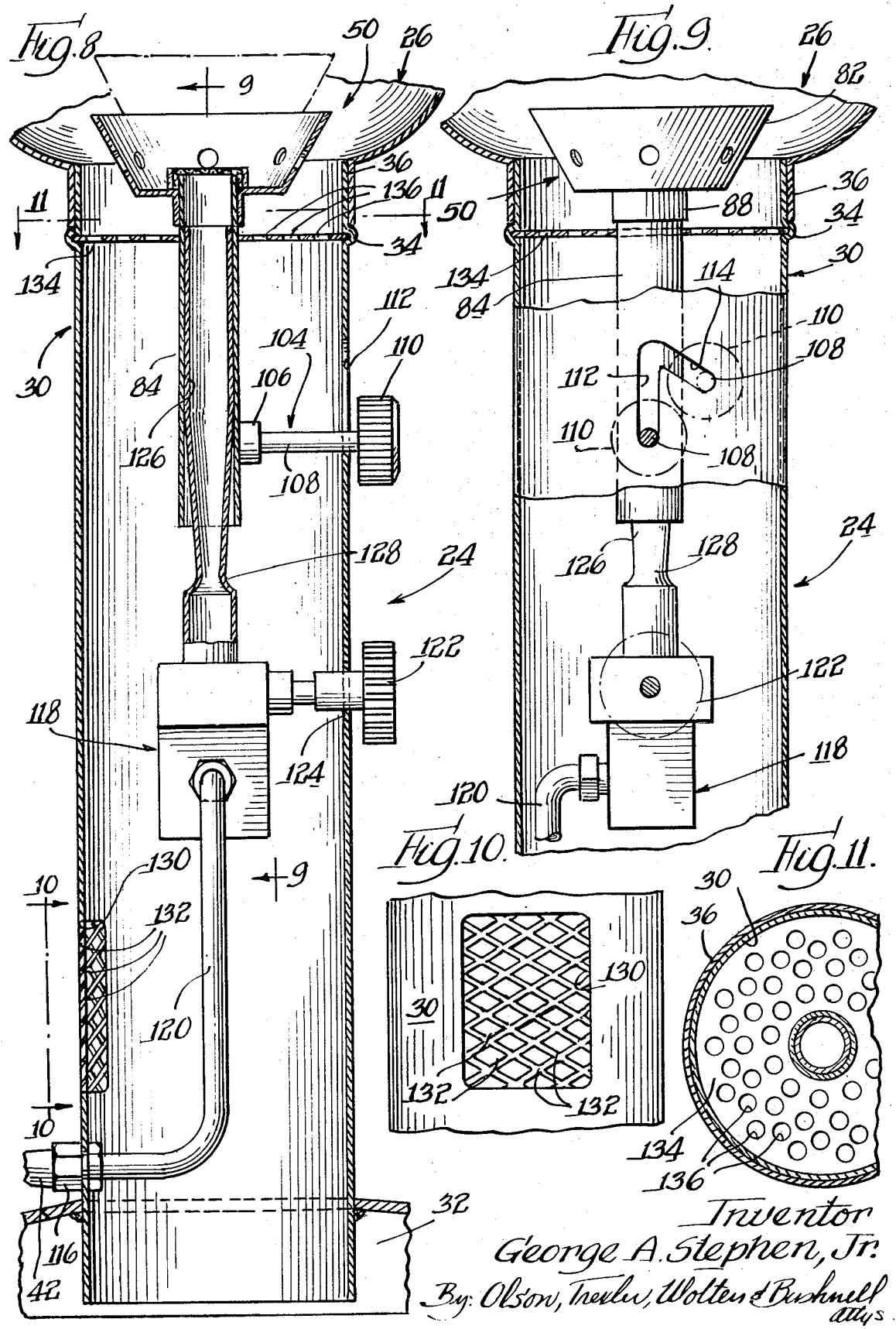

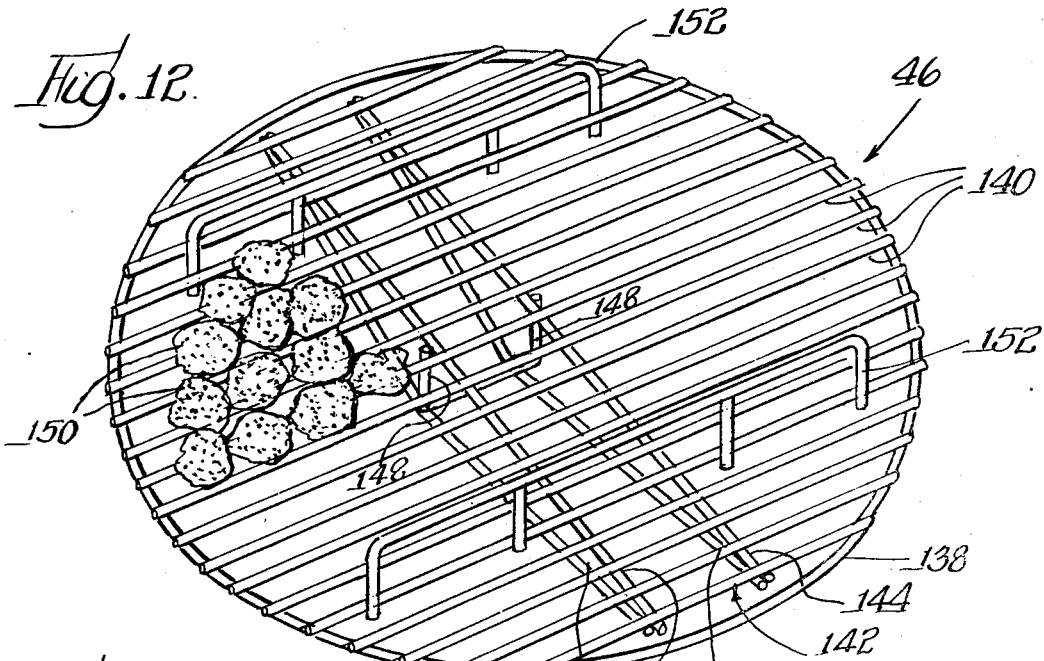
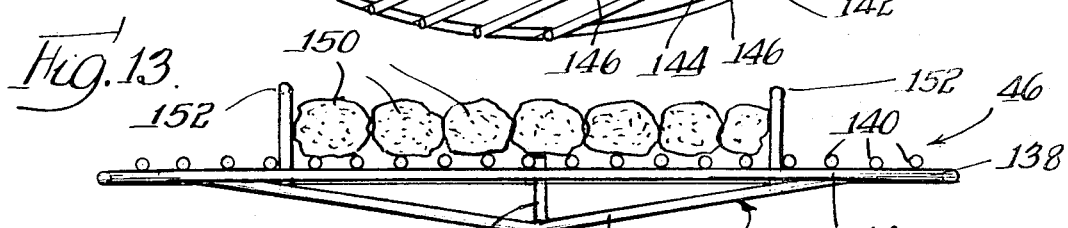
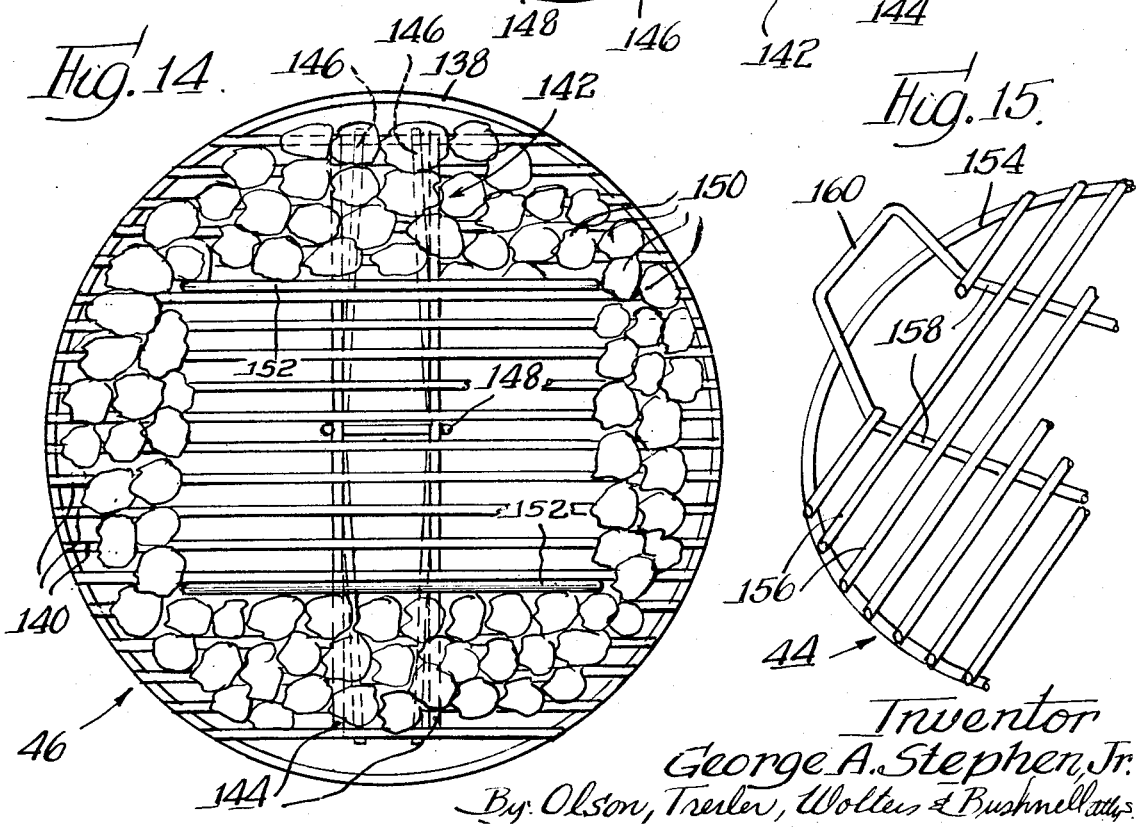
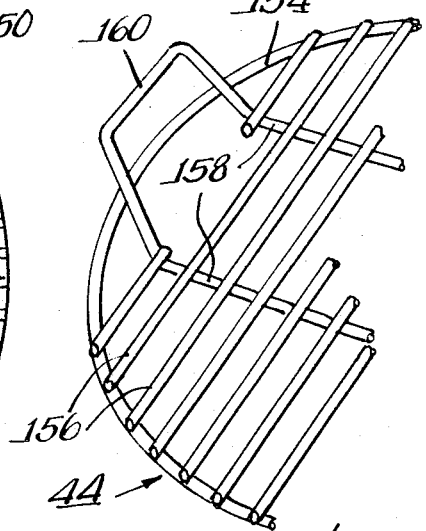

GAS FIRED BARBECUE KETTLE

This invention relates generally to outdoor cooking equipment and more particularly to such equipment that is fired with a fluid fuel.

In the past, certain types of outdoor cooking apparatus have been specially adapted to use a fluid fuel such as natural gas. However, problems have arisen in the use of the prior art equipment of this character; and specific difficulties have been encountered with the gas flame being extinguished by wind gusts or by accumulations of combustion products in a covered unit. In addition, grease that has been rendered from the cooking meat has caused clogging of flame jets, provided a fuel source for a sooty flame, and presented a generally unpleasant clean-up chore. Furthermore, prior gas-fired units have been arranged only for the grilling mode of cooking and thus have not been particularly useful for roasting large pieces of meat such as turkey or beef roasts.

Therefore, a general object of the present invention is to provide new and improved outdoor cooking apparatus that is arranged for utilization of a fluid fuel.

Another broad object of the present invention is to provide a novel gas-fired cooking kettle.

Still another object of the invention is to provide cooking apparatus that delivers an efficient supply of combustion air.

And still another object of the invention is to provide cooking apparatus that protects the cooking flame from wind gusts.

Yet another object of the invention is to provide cooking apparatus that insures clean combustion of any rendered grease.

A further object of the invention is to provide cooking apparatus that includes a heat-resistant rack for refractory bodies.

A still further object of the invention is to provide cooking apparatus that is easily adjusted between grilling and roasting modes of cooking.

And a still further object of the invention is to provide cooking apparatus that is arranged for both direct-fired and indirect-fired operation.

A yet further object of the invention is to provide outdoor cooking apparatus that is highly convenient to use.

These and other objects and features of the invention will become more apparent from a consideration of the following descriptions.

The invention, both as to its construction and its mode of use, will be better understood by reference to the following disclosure and drawings forming a part thereof, wherein:

FIG. 1 is a perspective view of outdoor cooking apparatus constructed in compliance with principles of the present invention and shown with the cover in place on the cooking kettle;

FIG. 2 is an enlarged elevational view of the cooking apparatus of FIG. 1 with the cooking vessel illustrated in central section to reveal the arrangement of the interior parts;

FIG. 3 is a perspective view in reduced scale showing the cover hung from an edge of the cooking kettle as for inserting or removing food;

FIG. 4 is an enlarged view taken in cross-section along the line 4—4 of FIG. 2;

FIG. 5 is an exploded perspective view on reduced scale of the burner and flame-directing baffle arrangement used in the cooking apparatus of FIGS. 1–3;

FIG. 6 is an enlarged cross-sectional view taken along the line 6—6 of FIG. 2 and showing the cooperative action of the burner elements and the flame-directing baffle arrangement;

FIG. 7 is a plan view on reduced scale taken along the line 7—7 of FIG. 6;

FIG. 8 is an enlarged central sectional view of the control housing and support post arrangement used in the out-door cooking apparatus of FIG. 1;

FIG. 9 is a sectional view taken substantially along the line 9—9 of FIG. 8;

FIG. 10 is an elevational view taken along the line 10—10 of FIG. 8 and showing the draft opening arrangement;

FIG. 11 is a plan view taken substantially along the line 11—11 of FIG. 8 and illustrating the air passageway system for the upper end of the control housing and support post arrangement;

FIG. 12 is an enlarged perspective view of the grate arrangement for supporting refractory bodies within the cooking apparatus of FIG. 1;

FIG. 13 is a side elevational view of the grate arrangement of FIG. 12, illustrating the arrangement of the refractory bodies for the grilling or direct-fired mode of cooking;

FIG. 14 is a top plan view of the grate arrangement of FIG. 12, illustrating the arrangement of the refractory bodies for the indirect firing or roasting mode of cooking; and FIG. 15 is a fragmentary perspective view showing the handle arrangement of the cooking grate.

Referring now in detail to the drawings, specifically to FIG. 1, outdoor cooking apparatus indicated generally by the reference numeral 20 comprises a cooking vessel unit 22 and a control housing and support post arrangement 24. The cooking vessel unit 22 includes a kettle 26 which houses the various grates, baffles and burner elements and a cover unit 28 which protects the contents of the kettle. The control housing and support post arrangement 24 includes an upright, tubular support post 30 which is welded or otherwise securely fastened to a ground pedestal 32. The post 30 may be supported on bases other than a ground pedestal.

The support post 30 is provided with a circumferential bead 34 which acts as a downstop for a bottom collar 36 of kettle 26. In mounting the kettle 26 to the support post 30, the collar 36 telescopes over the upper end of the support post until it engages the bead 34. For convenience in manipulation, a pair of horizontally extending, diametrically disposed handles 38 are affixed to the kettle 26 adjacent its upper edge. Similarly, a pair of upwardly extending, diametrically disposed handles 40 are affixed to the upper surface of cover unit 28. The outdoor cooking apparatus 20 is intended to utilize a fluid fuel such as natural gas; and for this purpose, the control housing and support post arrangement 24 includes a fitting for a gas line 42 as will be described more fully hereinafter.

Turning to FIG. 2, the kettle 26 houses a cooking grate 44, a grate 46 for refractory bodies, a flame-directing baffle unit 48, and the upper portion of a gas burner unit 50. In order to locate the grates 44 and 46 within the kettle 26, a suitable number of C-shaped straps 52 are welded or otherwise fastened to the interior surface of the kettle at arcuately spaced locations; and since it is convenient to have the flame-directing baffle unit 48 stationarily positioned within the kettle 26, a suitable number of angulated studs 54 are welded to the kettle 26 to radiate inwardly thereof to act as rests for the baffle unit. As will be described more fully hereinafter, the baffle unit 48 is arranged to take frusto-conical shape; and for purposes of insuring proper positioning of the baffle unit, that member is provided with a circumferential locating groove 56 into which fit the ends of the studs 54. When properly positioned within the kettle 26, the baffle unit 48 is spaced from the lower, inner wall of the kettle to define a lateral flame space 58 which is employed in the indirect-fired cooking mode advantageously employed in preparing large cuts of meat. To convert from the indirect-fired mode to the direct-fired mode of operation, the relative position of the baffle unit 48 and the burner arrangement 50 is altered in a manner to be described more fully hereinafter. However, in the direct-fired mode, the flame from the burner arrangement is directed generally upwardly through the baffle unit; and for this purpose, the baffle unit 48 is provided with a circular central aperture 60 which is best seen in FIG. 5.

Continuing with reference to FIG. 2, a pair of J-shaped hooks 62 are welded or otherwise securely fastened to the inside surface of the cover unit 28 at diametrically disposed positions generally planarly aligned with the cover handles 40. These hooks are used alternatively in hanging the cover unit from the kettle as is shown in FIG. 3. In this suspended condition of the cover unit, the free end of the selected hook 62 fits over the edge of the kettle 26, and the cover unit telescopes freely over the adjacent portion of the kettle.

The outdoor cooking apparatus 20 is arranged to have a generous through-put of air for efficient combustion while at the same time protecting the cooking flame from the adverse effects of strong breezes or wind gusts. Therefore and as is indicated generally in FIGS. 1 and 2, the cover unit 28 is fabricated with an aerodynamic, external shape, specifically spherical in the illustrated embodiment; and in further accord with the features of the present invention, the cover unit 28 is provided with a chimney unit 64. Turning to FIG. 4, the cover unit 28 is perforated with a central top opening 66, and the chimney unit 64 is mounted on the cover unit at this top opening. The chimney unit 64 comprises an imperforate, upstanding, cylindrical collar 68 which serves as a flue and which is fabricated with an annular basal flange 70 which is used in securing the collar to the cover unit as by spaced weldments 72. An imperforate cap member 74 is partially telescoped over the collar 68 and secured thereto by means including a suitable number of equally spaced straps 76. The cap 74 includes a downwardly extending cylindrical sidewall 78 that is spaced radially from the collar 68, and the straps 76 define spaces 80 therebetween for the egress of escaping smoke and other combustion products while the cooperation of collar 68 and cap 74 prevents strong breezes and wind gusts from entering the cooking vessel. The external shapes of the cover unit 28 and the collar 68 direct these breezes and wind gusts generally around the collar and away from it while the slight back pressure of exiting combustion products prevents these breezes and wind gusts from rising upwardly in the cap 74.

Giving consideration to FIGS. 5, 6 and 7 for a detailed description of the construction and operation of the flame-directing baffle unit 48 and the burner arrangement 50, the burner arrangement comprises a lower conical member 82 which is adapted to be connected to a fuel line by means of an elongated tube 84 and which is perforated with a number of air supply apertures 86. Conveniently, the conical member 82 terminates at its lower end in a sleeve 88 which fits over the tube 84 to be secured thereto by welding or other suitable means; and advantageously, a foraminous, flame-distributing member 90 is fastened across the top of tube 84 by an annular collar 92, the flame-distributing member 90 conveniently taking the form of a wire screen.

The burner arrangement 50 additionally includes a conical baffle 94 which is fastened to the member 82 by a suitable number of equally spaced brackets 96 so that is moves with the member 82. The brackets 96 space the baffle 94 generally above and slightly apart from the member 82 in order to define an annular burner space 98, best seen in FIG. 6; and both the member 82 and the baffle 94 are arranged with upwardly and outwardly flaring shapes, the angulation of the baffle 94 being somewhat shallower than that of the member 82.

As mentioned hereinabove, the baffle arrangement 48 is arranged to cooperate with the burner unit 50 to direct flame through the flame space 58 in the indirect mode of firing; and in order to control the distribution of flame in this mode, the conical baffle 94 includes an outwardly extending, upper, annular rim 100 which is situated above the baffle unit 48 as is best seen in FIG. 6. In addition, the baffle unit 48 is provided with a conical land 102 surrounding the central aperture 60 to receive and provide a seat for the rim 100, thus sealing off the juncture between the baffle unit 48 and the baffle 94 and promoting direction of the burner flame through the flame space 58.

The lower position of the burner arrangement 50 is approximated in FIG. 6 by the solid line showing, it being necessary to drop the burner unit slightly to complete this condition wherein the rim 100 seats against the land 102. The upper position of the burner unit which is employed in the direct-fired mode is suggested in broken outline in FIG. 6; and it will be appreciated that in this latter mode, the burner flame emanates from the flame space 98 generally above the baffle unit 48 to flare upwardly around the edge of the rim 100. It will also be appreciated that the burner arrangement 50 will also be lifted to the position shown in broken outline in order to ignite the fuel. A match hole, not shown, may be provided to permit fuel ignition in the lower burner position.

Turning to FIGS. 8 and 9, a handle arrangement 104 is attached to the elongated tube 84 of the burner arrangement 50, the handle arrangement including a nut 106 which is welded to the wall of tube 84, a horizontal post 108 having a threaded end which is turned into the nut 106, and a knob 110 which is mounted on the post 108 and which is disposed externally of the tubular post 30 to permit manual manipulation of the burner unit. Continuing with particular emphasis on FIG. 9, the support post 30 includes a vertical slot 112 having a confluent offset angular portion 114, the post 108 of handle arrangement 104 being situated in this slot to operate slidably therein. It will be appreciated from an inspection of FIG. 9 that the slot 112 and its offset portion 114 define vertically spaced terminal positions for the post 108. These positions are associated respectively with the upper and lower conditions of the burner unit and therefore the indirect-fired and direct-fired modes of operation.

Continuing with reference to FIGS. 8 and 9, gas is supplied to the burner arrangement 50 from the supply line 42 which is attached to the control housing and support post arrangement 24 by a fitting 116. The fitting is connected in turn to a valve unit 118 by a conduit 120, the unit 118 housing a conventional regulating valve by which gas flow to the burner arrangement is initiated, regulated and terminated. The valve unit 118 includes a control knob 122 which is disposed externally of the tubular support post 30 through a lateral opening 124 for convenience in operation. The supply connection to the burner arrangement 50 is completed by a tubular member 126 which fits slidably within the tube 84 and which is fashioned with an orifice device such as a venturi throat 128 located adjacent the valve unit 118. The snugness of the fit between tube 84 and tubular member 126 combines with the length of the section of sliding fit to provide a gas-tight seal.

In order to supply primary and secondary combustion air to the burner unit 50, the tubular support post 30 is apertured with a rectangular draft opening 130 which is fitted with a number of criss-crossed vanes 132. As will be seen in FIG. 8, the vanes 132 have a permanent, downward angulation whereby to deflect air gusts from the burner and modulate the flow of incoming air. The tubular support post 30 opens into the kettle 26 through a plate 134 which is set into the groove formed internally of the support post at the bead 34 as is shown in FIGS. 8 and 9. So that combustion air may pass to the burner arrangement 50, the plate 134 is perforated with numerous holes 136 as is best seen in FIG. 11.

Turning now to a consideration of FIGS. 12–14 for a description of the rack which is supported closest to the baffle unit 48, the lower or refractory body grate 46 comprises an endless rim 138 and a network of parallel grate rods 140, the rim 138 and the grate rods 140 being fabricated from a suitable gauge of wire and being rigidly interconnected by welding at the points where the rods 140 contact the rim 138. Because the kettle 26 takes a generally hemispherical shape, the grate 44 is made to be generally circular to coincide with the horizontal cross-section of the kettle; and in compliance with a feature of the present invention, a brace unit 142 is arranged to span a transverse mid-portion of the network of rods 140 on the underside thereof.

The brace unit 142 includes a pair of spaced horizontal brace rods 144 which extend across the network of grate rods perpendicularly thereto and from one end rod in the network to the opposite end rod, the brace rods 144 being welded to the individual grate rods 140 at each juncture. The brace unit 142 also includes a pair of spaced V-shaped members 146 which are fastened to the endmost grate rods 140 generally interjacent the brace rods 144 as is best shown in FIG. 14. The V-shaped members 146 bow outwardly from their connection to the endmost grate rods toward the midline of the grate 46 where a U-shaped support 148 is secured to both of the V-shaped members and to the overlying brace rods 144.

From an inspection of FIG. 2, it will be apparent that the grate 46 is situated in close proximity to the burner arrangement 50 and directly exposed to the heat of the burner flame in the direct fired mode of operation. Under these circumstances, the grate is exposed to intense temperatures on the order of 1,000°–1,200° F., sufficient temperature to soften the metal of an ordinary grate and promote its sagging in a central region. The brace arrangement 142 effectively prevents this undesirable occurrence.

It has proved advantageous to stack a quantity of refractory bodies on the grate 46 to promote uniformity in heating and the clean combustion of rendered grease. Lightweight porous refractory bodies such as suitably sized pumice stone fragments have proved eminently useful for this purpose, and a quantity of such stone fragments 150 is shown distributed centrally of the grate 46 in FIG. 13. So positioned, the stone fragments 150 promote the direct-fired mode of operation used for grilling such things as steaks; and where the maximum grilling area is desired, the fragments 150 may be distributed over the entire surface of the grate 46. For the indirect-fired mode of operation, the pumice stone fragments 150 are re-arranged to reside exclusively about the perimeter of the grate as is shown in FIG. 14. It has proved advantageous to provide a mechanical means for preserving a selected arrangement of the stone fragments 150; and for that purpose, a pair of upstanding racks 152 is fastened to the grate 46 as is shown in FIGS. 12–14. It is to be understood that a separate rack arrangement could be provided for situation on the grate 46. In addition, a drip pan may be placed in the center of grate to collect rendered grease as for example when the same is desired for basting.

To the extent that the heat from the burner flame in insufficient to consume all of the grease rendered from the meat and convert it to a clean carbon ash, the stone fragments 150, being extremely porous in nature, absorb the excess grease so that it may be consumed when the rendering rate is reduced or upon completion of the cooking operation.

Considering FIG. 15, the cooking grate 44 likewise comprises a peripheral rim 154 and a network of horizontal grate rods 156. In addition, transverse brace bars 158 are welded to the network rods 156 to provide a rigid structure; and in the case of the cooking grate 44, the brace rods 158 are turned upwardly at the ends and joined to form handles 160.

The specific embodiment herein shown and described is to be considered as being primarily illustrative. Various changes in structure will, no doubt, occur to those skilled in the art; and such changes are to be understood as forming a part of this invention insofar as they fall within the spirit and scope of the appended claims.

The invention is claimed as follows:

1. Cooking apparatus comprising: cooking vessel means; support means for said cooking vessel means; flame-directing baffle means mounted in said cooking vessel means to be spaced apart from the lower, inner wall thereof defining a lateral flame space for one cooking mode, said baffle means having a generally central aperture; burner means situated adjacent said aperture; and control means for shifting the relative position of said burner means and said baffle means whereby to direct flame through said flame space in a first position and upwardly of said aperture in a second position.

2. Cooking apparatus as defined in claim 1 wherein said baffle means is stationarily positioned in said vessel means and wherein said control means includes handle means connected to said burner means for manually shifting said burner means between said positions.

3. Cooking apparatus according to claim 2 wherein said support means includes a slot having an offset portion, said slot defining vertically spaced positions and wherein a portion of said handle is disposed in said slot.

4. Cooking apparatus according to claim 1 wherein said baffle means is frusto-conical in shape.

5. Cooking apparatus according to claim 1 wherein said burner means includes a lower conical member adapted to be connected to a fuel line and having air supply apertures, a conical baffle fastened to said conical member to move therewith and spaced from said conical member to define an annular burner space, and flame-distributing means disposed generally interjacent said conical member and said conical baffle.

6. Cooking apparatus according to claim 5 wherein said conical member and said conical baffle are upwardly and outwardly flaring.

7. Cooking apparatus according to claim 5 wherein said flame-distributing means includes a foraminous member.

8. Cooking apparatus according to claim 7 wherein said foraminous member is a screen.

9. Cooking apparatus according to claim 5 wherein said conical baffle includes outwardly extending rim means disposed above said flame-directing baffle means and radiating outwardly beyond the edges of said aperture, said rim means seatably engaging said flame-directing baffle means in said first position.

10. Cooking apparatus according to claim 1 wherein said cooking vessel means includes kettle means and cover means for said kettle means.

11. Cooking apparatus according to claim 10 which further includes hook means secured to the inside of said cover means for use in hanging said cover means from an edge of said kettle means.

12. Cooking apparatus according to claim 10 wherein said cover means includes an aerodynamically shaped cover member having a top opening therein and chimney means mounted on said cover member at said top opening.

13. Cooking apparatus according to claim 12 wherein said chimney means includes an imperforate collar upstanding from said cover member, an imperforate cap, and mounting means securing said cap over said collar and spaced above said collar to define an egress pathway for the escape of combustion products.

14. Cooking apparatus according to claim 13 wherein said cap includes a downwardly extending sidewall spaced radially from said collar.

15. Cooking apparatus according to claim 1 which further includes a grate and means for supporting said grate above said flame-directing baffle means, said grate including a network of rigidly interconnected grate rods and brace means spanning the mid-portion of said network.

16. Cooking apparatus according to claim 15 wherein said brace means comprises spaced horizontal brace rods, spaced V-shaped members between said brace rods and U-shaped support means connecting said brace rods and said V-shaped members.

17. Cooking apparatus according to claim 1 wherein said support means includes a tubular support post opening into said cooking vessel means beneath said flame-directing baffle means, said support post having a draft opening.

18. Cooking apparatus according to claim 17 which further includes vane means in said draft opening.

19. Cooking apparatus according to claim 1 which further comprises fuel supply means and slidable connection means coupling said fuel supply means to said burner means.

20. Cooking apparatus according to claim 19 wherein said slidable connection means includes first tube means fastened to said burner means, second tube means tele-scoping with said first tube means and adapted to be connected to a fuel source, and orifice means in one of said tube means.

* * * * *